Jan. 21, 1936.  E. H. LENZ  2,028,288

CROSS CHAIN COUPLING

Filed April 4, 1935

Inventor
E-H-Lenz

Patented Jan. 21, 1936

2,028,288

UNITED STATES PATENT OFFICE 2,028,288

CROSS-CHAIN COUPLING

Edward H. Lenz, Valders, Wis.

Application April 4, 1935, Serial No. 14,650

2 Claims. (Cl. 24—201)

This invention appertains to fastening devices, and more particularly to a novel coupling or link for cross-chains and the like.

One of the primary objects of my invention is the provision of a novel coupling link, so constructed and arranged that a strong and durable connection is had at all times, and one that can be readily and easily disconnected to permit repairs to be made to the chain.

Another salient object of my invention is the provision of a coupling link for chains embodying a plate having a hook-shaped tongue and laterally extending ears, the tongue receiving one link of the chain and being adapted to be permanently forced around said link, the ears detachably receiving threaded legs formed on an open link of the chain, said threaded legs receiving nuts for detachably connecting the open link to said plate to permit the disconnection of the coupling link for repairs and the like.

A further important object of my invention is to provide an improved coupling link for cross-chains of the above character, which will be durable and efficient in use, one that will be simple and easy to manufacture, and one which can be placed upon the market and incorporated with a chain at a low cost.

With these and other objects in view, the invention consists in the novel construction, arrangement, and formation of parts, as will be hereinafter more specifically described, claimed, and illustrated in the accompanying drawing, in which drawing:

Figure 1:
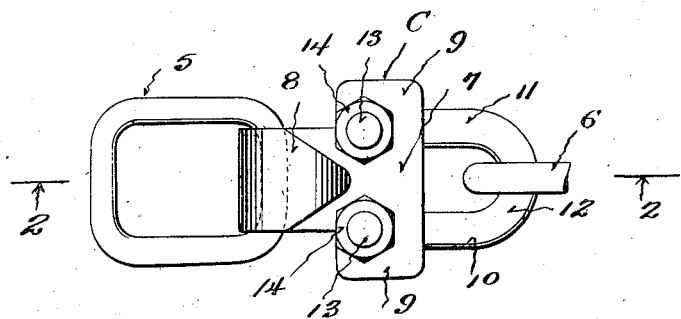
Figure 1 is a top plan view of my improved coupling link.
Figures 2, 3:
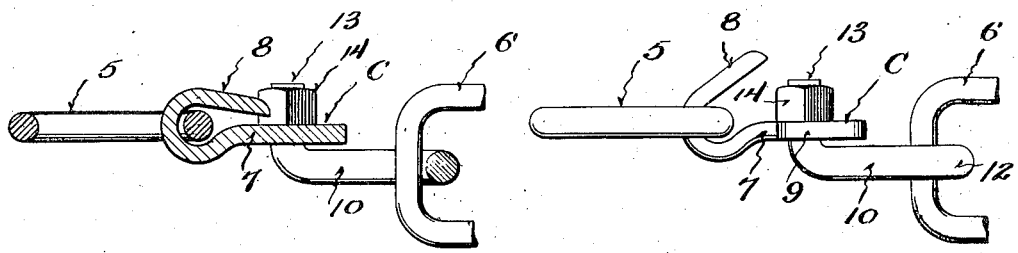
Figure 2 is a longitudinal section through the same taken substantially on the line 2—2 of Figure 1.
Figure 3 is a side elevation of the coupling, showing the hook-shaped tongue of the plate in its open position and prior to being permanently forced around a chain link.

Referring to the drawing in detail, wherein similar reference characters designate corresponding parts throughout the several views, the letter C generally indicates my improved coupling for the links 5 and 6 of a chain.

The improved coupling C comprises a flat plate 7 having formed thereon the forwardly projecting hook-shaped tongue 8 and laterally projecting apertured ears 9. The hook-shaped tongue 8 is adapted to receive one link 5 of the chain, and after the link 5 is in position the tongue 8 is mashed down permanently around said link 5, whereby disconnection of the link 5 and the plate 7 will be prevented.

The plate 7 is connected with an open link 10 for connection with the chain link 6. The open link 10 is of a substantially U-shaped construction in plan, and includes the spaced parallel side arms 11 and the connecting bight portion 12. The forward terminals of the arms 11 have formed thereon the right angularly extending threaded legs 13, which are adapted to be inserted through the apertures of the ears 9. Nuts 14 are threaded on the legs 13 in tight contact with the plate.

This forms an exceptionally strong and durable connection, and when the chain is to be disconnected for any reason, such as repairing or the like, the nuts 14 are removed, and the open link 10 can then be removed from the plate and from the chain link 6, if so desired.

Changes in details may be made without departing from the spirit or the scope of this invention, but what I claim as new is:

1. A coupling link for chains comprising a plate having a malleable hook-shaped tongue for receiving one link of a chain and laterally extending apertured ears, an open U-shaped link for receiving another link of the chain, angularly extending threaded legs formed on the ends of the U-shaped link detachably received in the apertures of the ears, and means detachably connecting the legs with said ears.

2. A coupling for chains comprising a plate having a hook-shaped tongue on one end and laterally extending apertured ears on the other end, the hook-shaped tongue receiving one link of the chain and adapted to be permanently forced around said link, an open U-shaped link for receiving another link of a chain, angularly extending threaded legs formed on the open U-shaped link received in the apertures of the ears, and nuts detachably threaded on said legs for engaging said ears.

EDWARD H. LENZ.